Oct. 16, 1962　　　R. SCHUSTER　　　3,058,640
FEEDING ATTACHMENT FOR WOODWORKING MACHINES
Filed Sept. 16, 1958　　　2 Sheets-Sheet 2
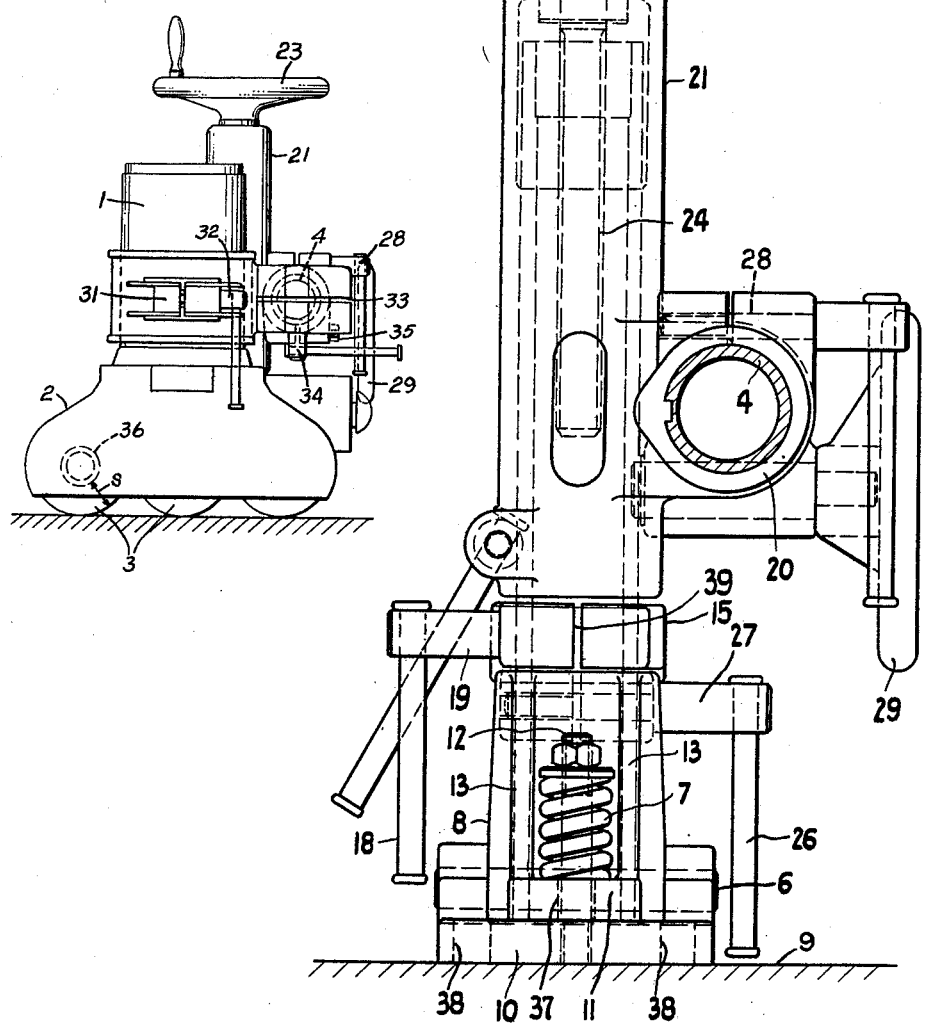
INVENTOR.
Roman Schuster
BY Michael S. Striker
Attorney United States Patent Office 3,058,640
Patented Oct. 16, 1962

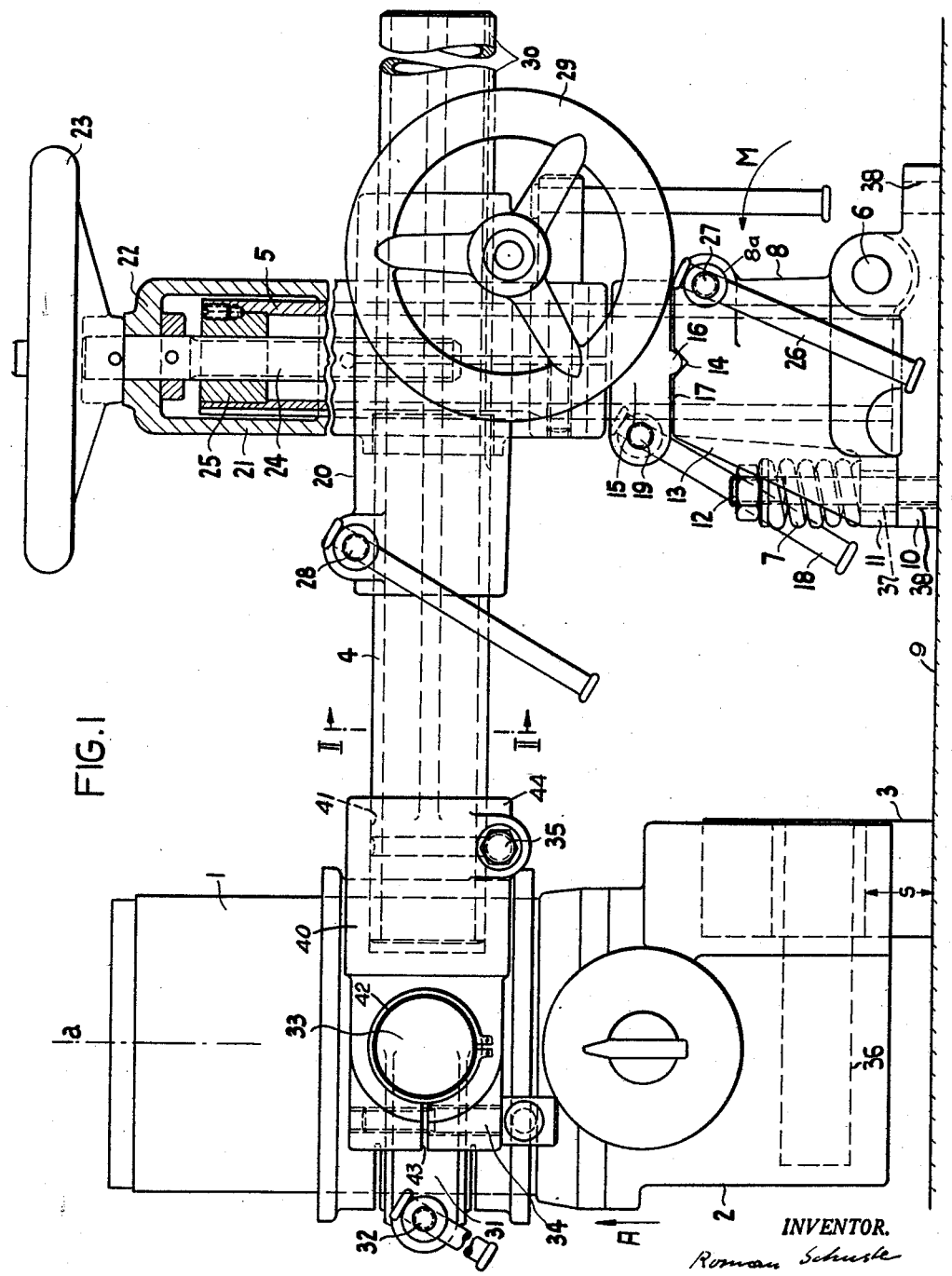

3,058,640
FEEDING ATTACHMENT FOR WOODWORKING MACHINES
Roman Schuster, Senden (Iller), Germany
Filed Sept. 16, 1958, Ser. No. 761,328
Claims priority, application Germany Sept. 19, 1957
9 Claims. (Cl. 226—108)

This invention relates to feeding attachments for woodworking machines, comprising a column adapted to be fixed to the machine table, a horizontal cantilever arm, and a feed unit supported on said cantilever arm and comprising a motor, a gear box and feed rollers. The known feeding attachments of this type are rather costly to manufacture and also relatively complicated in operation. In known feeding attachments the feed rollers are individually movable in an up and downward direction, and are resiliently supported in the feeding unit. Consequently, individual carriages or swinging arms, and individual springing means must be provided for each of the feed rollers. It is obvious that this results in high manufacturing costs.

It is an object of the invention to obviate the drawbacks of the known devices by providing a feeding attachment for woodworking machines which is of simpler construction and therefore cheaper to manufacture, and which is also simpler and easier in operation.

In the feeding attachment according to the present invention the axles of the feed rollers are rigidly supported in the feed unit, and the vertical column is mounted pivotable about a horizontal axis on a base plate which is adapted to be fixed to the machine table, resilient means being provided which press the column against the base plate and permit pivotal movement of the column about the said horizontal axis. This pivotable mounting of the column together with the whole feed unit, about a horizontal axis situated on the column base makes it possible to pass also work of different thickness through this feeding attachment, the application pressure of the feed rollers remaining practically constant during lifting and lowering of the feed unit. In an advantageous arrangement the feed rollers are provided with a heavy rubber covering so that minor differences in the thickness of the work are compensated for by the resiliency of this rubber covering.

An embodiment of the present invention is illustrated, by way of example only, in the accompanying drawings in which FIG. 1 shows a feeding attachment according to the invention in elevation, FIG. 2 is a vertical sectional view taken along line II—II of FIG. 1, and FIG. 3 is an end view on a reduced scale of the device as seen from the left in FIG. 1.

As shown in the drawings, an electric motor 1 with a gear box 2 constitutes a self-contained feed unit together with feed rollers 3 which are adapted to be driven by said motor. In this feed unit are rigidly supported the axles 36 of the feed rollers. In order to compensate for minor differences in the thickness of the work, the feed rollers are provided with a heavy rubber covering of substantial thickness $s$. If the diameter $d$ of the feed rollers is, for example, 4.724 in. (120 mm.), the thickness $s$ of the rubber covering of these rollers is about 1.500 in. (38 mm.).

The feed unit is carried by a horizontal cantilever arm 4 which is connected with a column 5 by a cruciform housing 20, 21. According to the invention this column is supported pivotable about a horizontal axis 6 arranged on the column base, and there is provided a spring 7 which acts on the column and exerts a left-hand turning moment M about axis 6, which causes the feed rollers 3 to be pressed against the work with uniform pressure during the passage of the timber through the machine. Normally, the resiliency of the heavy rubber covering of the feed rollers 3 is quite sufficient when timber of equal thickness is passed through the machine as is regularly the case for example, in milling machines. If, however, timber of unequal thickness is used or timber which is uneven on the side on which it passes through the machine, the resiliency of the rubber covering 3 will no longer be sufficient, i.e. the entire feeding attachment will pivot about the axis 6 during the passage of thicker timber, respectively in the case of overloading, the spring 7 not only providing the necessary application pressure for the feed rollers, but also assuring that the feeding attachment will always return to the original position shown, after the passage of the timber. The strength of the springing is such that a smooth and uniform passage or feed is assured in the position shown in the drawing (dead position).

In the advantageous embodiment shown in the drawing the column 5 is mounted in a column base 8 which by a horizontal pivot pin 6 is pivotably connected with a base plate 10 adapted to be bolted to a machine table 9. The base plate 10 is provided with holes 38 for the passage of fixing screws or bolts (not shown). The column base 8 on its one side is mounted on the base plate 10 by means of the pivot pin 6, and on the other side bears against base plate 10 with a horizontal extension 11. The base plate 10 carries a vertical stay-bolt 12 projecting through a hole 37 in extension 11 and carrying a helical compression spring 7 which bears against extension 11. Reinforcing webs 13 are conveniently provided on both sides of extension 11 for stiffening the column base 8.

As may be seen from FIG. 1, only a slight angular movement about the axis 6 will occur during a vertical displacement of the feed unit in direction A, so that the travel of spring 7 will also be very small during such angular movement, and consequently the spring force and the resulting application pressure of the feed rollers 3 remains approximately constant.

As may further be seen from the drawings, a notch-like recess 14 is provided in the upper plane surface of the column base, and a supporting ring 15 is arranged on the column 5 and adapted to be clamped thereto, said supporting ring 15 being provided with a projection 16 which is adapted to engage into recess 14, as shown in FIG. 1. Thereby the feed unit is positively located in the operative position. If it is desired to swing the attachment out of the feed path of the machine, for example when changing tools or when the machine must be free for manual work, the arrangement described above will easily permit such swinging movement. It is only necessary to press firmly against the feeding attachment, so that the torque which is thereby exerted on column 5 will cause projection 16 to disengage from recess 14, respectively will urge this projection upwardly so that it will then slide on the plane upper surface 17 of base 8 and the unit 1—3 may now be swung into any desired position. When the attachment is swung back, projection 16 re-engages in recess 14, so that by these means the feeding attachment is again brought into its operative position in a most simple and easy manner.

As may be seen from the drawings, the supporting ring 15 is arranged on the column 5 so as to be rotatable as well as axially displaceable thereon. It is split at 39 and may be clamped in any desired position on column 5 by means of a clamping screw 19 operated by a handle 18. By means of this arrangement the angular position of the cantilever arm 4 may also be adjusted as desired.

As further shown in the drawing, there is also provided a cruciform housing comprising two substantially cylindrical bearing sleeves, the horizontal bearing sleeve 20 serving for the mounting of the cantilever arm 4, and the vertical bearing sleeve 21 which is slid over the upper part of column 5 and is adapted to be clamped in position thereon, is closed at its upper end by an end wall 22 which serves to rotatably support a spindle 24 which is adapted to be operated by a hand wheel 23 and co-operates with a spindle nut 25 fixedly mounted in column 5. When the spindle 24 is turned the housing 20, 21 is raised or lowered, so that thereby the desired vertical position of the feed unit is exactly adjustable. The sleeve 21 is mounted axially displaceable on column 5, but is locked against rotation relative thereto. The column 5 may also be adjusted vertically in the split base 8 which has a vertical gap in its portion 8a. A clamping screw 27 operated by a handle 26 is provided on the split column base 8 and passes through the split portion 8a for clamping the column 5 in position. In similar manner, the cantilever arm 4 may also be clamped in the bearing sleeve 20 by means of a clamping screw 28. The cantilever arm 4 which is locked against rotation in this sleeve 20 may, in known manner, be displaced lengthwise by means of a hnadwheel 29, a pinion fixed on the hand wheel shaft engaging with a rack 30 on the cantilever arm.

The feed unit is supported in a split clamping member 31 for turning movement about the vertical axis a, and is normally clamped in an adjusted position by means of a clamping bolt 32 passing through the split portion of clamping member 31. Clamping member 31 has on one side a horizontal pivot shaft 33 projecting into a corresponding opening 42 of another clamping member 40 which is split at 43. A clamping bolt 34 passes through the split portion of clamping member 40 so that pivot shaft 33 can be clamped in an adjusted position of the feed unit. By this adjustment, the axis a can be placed in an exactly vertical position with the peripheral surface of rollers 3 properly engaging the table 9.

The other end of clamping member 40 has a split portion 44 through which another clamping bolt 35 passes. At this end of the clamping member 40, an inner recess 41 is provided into which shaft 4 projects. When clamping bolt 35 is operated, the free end of shaft 4 can be clamped in clamping member 40, but upon loosening of the clamping bolt 35, the position of the feed unit can be adjusted by turning the same about the axis of shaft 4 until all rollers 3 are located on the machine table 9, as will be best understood with reference to FIG. 2.

What is claimed is:

1. A feeding attachment for woodworking machines, comprising a feed unit including a motor, and feed rollers driven from said motor, axles for said feed rollers rigidly supported in said feed unit, a horizontal cantilever arm carrying said feed unit, a vertical column, means for connecting said column with said cantilever arm, a base plate on which said column is pivotally supported about a horizontal axis, and resilient means adapted to press said column against said base plate and permitting pivotal movement of said column about said horizontal axis.

2. A feeding attachment for woodworking machines, comprising a feed unit including a motor, a gear box and feed rollers, axles for said feed rollers rigidly supported in said feed unit, a horizontal cantilever arm carrying said feed unit, a vertical column, means for connecting said column with said cantilever arm, a column base in which said column is mounted, a base plate including a horizontal pivot pin on which said column base is pivotally mounted on the side thereof remote from said feed unit, a stay-bolt fixedly mounted in said base plate on the side thereof adjacent said feed unit, and a helical spring arranged on said stay-bolt and adapted to press said column base against said base plate.

3. A feeding attachment for woodworking machines, comprising a feed unit including a motor, a gear box and feed rollers, axles for said feed rollers rigidly supported in said feed unit, a horizontal cantilever arm carrying said feed unit, a vertical column, means for connecting said column with said cantilever arm, a column base split along a vertical gap, said column being mounted axially adjustable in said column base, clamping bolt means on said column base for adjusting the width of said gap for clamping said column in said split column base, a base plate including a horizontal pivot pin on which said column base is pivotally supported, a stay-bolt fixedly mounted in said base plate, and a helical spring arranged on said stay-bolt and adapted to press said column base against said base plate.

4. A feeding attachment for woodworking machines, comprising a feed unit including a motor, a gear box and feed rollers, axles for said feed rollers rigidly supported in said feed unit, a horizontal cantilever arm carrying said feed unit, a vertical column, means for connecting said column with said cantilever arm, a column base in which said column is mounted, a notch-shaped recess in the upper surface of said column base, a split clamping ring slidably arranged on said column and adapted to be clamped in position thereon and having a projection adapted to engage in said recess, a base plate on which said column base is pivotally supported about a horizontal axis, and resilient means adapted to press said column base against said base plate.

5. The feeding attachment according to claim 1, comprising a rubber covering on said feed rollers, the thickness of said covering being approximately one fourth of the diameter of said feed rollers.

6. The feeding attachment according to claim 1, comprising a column, a nut fixedly secured to the upper end of said column, a cruciform housing comprising two cylindrical sleeves of which one is arranged in a substantially horizontal direction and the other one is arranged in a substantially vertical direction, said cantilever arm being supported in said horizontal sleeve and said vertical sleeve being slid over the upper end of said column and adapted to be clamped in position thereon, and a vertical spindle with a hand wheel rotatably supported at the upper end of said vertical sleeve and adapted to co-operate with said nut.

7. Feeding arrangement comprising, in combination, a base; supporting means supported on said base for turning movement and including an arm having a free end; a feed unit mounted on said free end, and including driven rotatable feed roller means adapted to engage an object, and means rigidly supporting said feed roller means; and spring means connecting said supporting means and said base and urging said supporting means to turn in one direction into a position abutting said base so that said feed roller means is resiliently pressed against the object, said supporting means being turnable in the opposite direction when an irregular portion of the object passes said feed roller means.

8. A feeding arrangement comprising, in combination, a base means; supporting means supported on said base means for turning movement and including an arm having a free end; a feed unit mounted on said free end, and including driven rotatable feed roller means adapted to engage an object, and means rigidly supporting said feed roller means; biasing means connected to said supporting means for urging said supporting means to turn in one direction; and means on said base means for blocking turning movement of said supporting means in said one direction in a position in which said feed roller means is in a normal working position, so that said feed roller means is pressed against the object, said supporting means being turnable in the opposite direction by an irregular portion of the object, passing under said feed roller means.

9. Feeding arrangement comprising, in combination, a base; supporting means supported on said base for pivotal movement and including an arm having a free end; a feed unit mounted on said free end and including driven rotatable feed roller means adapted to engage an object, and means supported on said arm for angular adjustment about at least one axis and rigidly supporting said feed roller means; and resilient means connecting said supporting means and said base and urging said supporting means to pivot in one direction into a position abutting said base so that said feed roller means is resiliently pressed against the object, said supporting means being pivotable in the opposite direction when an irregular portion of the object passes said feed roller means.

References Cited in the file of this patent

UNITED STATES PATENTS 2,128,409     Hager _____ Aug. 30, 1938

FOREIGN PATENTS 1,131,949     France _____ Oct. 29, 1956